United States Patent
Hess et al.

(10) Patent No.: US 12,000,477 B2
(45) Date of Patent: Jun. 4, 2024

(54) ACTUATION OF A CONVERTER LOCK-UP CLUTCH OF A HYDRODYNAMIC TORQUE CONVERTER BY MEANS OF A SAFETY FUNCTION

(71) Applicant: ZF Friedrichshafen AG, Friedrichshafen (DE)

(72) Inventors: Christoph Hess, Eriskirch (DE); Jörg Arnold, Immenstaad (DE); Jens Weller, Constance (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 17/816,458

(22) Filed: Aug. 1, 2022

(65) Prior Publication Data
US 2023/0046052 A1     Feb. 16, 2023

(30) Foreign Application Priority Data
Aug. 12, 2021   (DE) ..................... 10 2021 208 816.3

(51) Int. Cl.
  *F16H 61/14* (2006.01)
  *F16D 48/06* (2006.01)
  (Continued)

(52) U.S. Cl.
  CPC .......... *F16H 61/143* (2013.01); *F16D 48/06* (2013.01); *F16H 59/40* (2013.01); *F16H 59/44* (2013.01);
  (Continued)

(58) Field of Classification Search
  CPC .......... F16D 48/06; F16D 2500/10412; F16D 2500/3067; F16D 2500/30806; F16D 2500/30825; F16D 2500/3108; F16H 61/143; F16H 59/40; F16H 59/44; F16H 59/46; F16H 59/70; F16H 2059/366
  See application file for complete search history.

(56) References Cited

U.S. PATENT DOCUMENTS 5,263,387 A   11/1993   Reniers
5,314,385 A    5/1994   Haley et al.
(Continued)

FOREIGN PATENT DOCUMENTS

DE    198 24 772 A1    12/1998
DE    101 59 640 A1     6/2003
(Continued)

OTHER PUBLICATIONS

German Patent Office, Search Report issued in German Patent Application No. 10 2021 208 816.3 (dated Feb. 2, 2022).

*Primary Examiner* — Edwin A Young
(74) *Attorney, Agent, or Firm* — Finch & Maloney PLLC

(57) ABSTRACT

The invention relates to the actuation of a converter lock-up clutch (44) of a hydrodynamic torque converter (4) in a vehicle drive-train by means of a safety function where, in addition to a driving strategy function, the safety function can actuate the converter lock-up clutch (44) by issuing a clutch actuation command. For this purpose, at least one rotation speed at the torque converter (4) is monitored. If the monitored rotation speed is below a rotation speed threshold, the safety function commands an actuation of the converter lock-up clutch (44) in its opening direction.

16 Claims, 1 Drawing Sheet

(51) Int. Cl.
*F16H 59/40* (2006.01)
*F16H 59/44* (2006.01)
*F16H 59/46* (2006.01)
*F16H 59/70* (2006.01)
*F16H 59/36* (2006.01)

(52) U.S. Cl.
CPC ............ *F16H 59/46* (2013.01); *F16H 59/70* (2013.01); *F16D 2500/10412* (2013.01); *F16D 2500/3067* (2013.01); *F16D 2500/30806* (2013.01); *F16D 2500/30825* (2013.01); *F16D 2500/3108* (2013.01); *F16H 2059/366* (2013.01)

(56) References Cited

U.S. PATENT DOCUMENTS

| | | | |
|---|---|---|---|
| 5,787,710 | A | 8/1998 | Baeuerle |
| 6,102,176 | A | 8/2000 | Fujikawa |
| 6,155,396 | A | 12/2000 | Tsubata et al. |
| 6,467,262 | B1 | 10/2002 | Baeuerle |
| 8,292,783 | B2 | 10/2012 | Lee et al. |
| 2004/0229728 | A1* | 11/2004 | Oshima ................. F16H 61/143 477/176 |
| 2008/0047795 | A1 | 2/2008 | Gierer et al. |
| 2017/0335926 | A1* | 11/2017 | Schiele ............... F16H 61/0204 |
| 2019/0219158 | A1* | 7/2019 | Stehle ................ F16H 61/0213 |

FOREIGN PATENT DOCUMENTS

| | | |
|---|---|---|
| DE | 102 38 104 A1 | 3/2004 |
| DE | 10 2004 020 569 A1 | 12/2005 |
| DE | 10 2005 060 562 A1 | 7/2006 |
| DE | 102005060562 A1 * 7/2006 ............ F16D 48/06 |
| EP | 1 906 063 A2 | 4/2008 |

\* cited by examiner

ACTUATION OF A CONVERTER LOCK-UP CLUTCH OF A HYDRODYNAMIC TORQUE CONVERTER BY MEANS OF A SAFETY FUNCTION

RELATED APPLICATIONS

This application claims the benefit of and right of priority under 35 U.S.C. § 119 to German Patent Application no. 10 2021 208 816.3, filed Aug. 12, 2021, the contents of which are incorporated herein by reference in its entirety

FIELD OF THE DISCLOSURE

The invention relates to a method for actuating a converter lock-up clutch of a hydrodynamic torque converter in a vehicle drive-train by means of a safety function. The method is used in particular for the stopping or slow maneuvering of a vehicle, i.e. when the speed is so low that at least slipping operation of the converter lock-up clutch is needed. The invention also relates to a vehicle control unit for such actuation of such a converter lock-up clutch, and a computer-readable storage medium with program code means stored on it for carrying out the method.

BACKGROUND

Hydrodynamic torque converters are used in technology in numerous forms and sizes. Such a torque converter is based on the so-termed Föttinger principle. The principle of their structure and their advantages are known to those familiar with the field. In vehicle manufacture hydrodynamic torque converters are often used as starting clutches. Particularly in automatic transmissions, which select and can engage the available gear steps automatically, hydrodynamic torque converters are used as standard.

As a general rule, a hydrodynamic torque converter used in a vehicle drive-train has a lock-up clutch, also called a bridging clutch. This is intended after the starting process to eliminate or at least reduce the hydrodynamic losses of the torque converter. For that purpose the lock-up clutch forms a rotationally fixed mechanical connection between the input and output of the torque converter. To do this, after the starting process of the vehicle the lock-up clutch is partially or fully closed. The lock-up clutch then produces a solid through-drive to the drive engine of the vehicle.

To hold the vehicle at rest or to maneuver slowly, the lock-up clutch must be opened in good time. If this is not done, the rotation speed of the drive engine is reduced by the solid through-drive of the converter to the drive engine. If the drive engine is in the form of an internal combustion engine the idling speed control then intervenes. If the idling speed control is set high enough, the rotation speed of the drive engine increases against the wishes of the driver to hold steady or drive slowly, in order to prevent stalling of the engine. This brings about an undesired acceleration of the vehicle. In contrast, an idling speed control that is set too low allows the rotation speed of the drive engine to fall so much that the engine stalls.

Holding at rest or slow maneuvering of the vehicle is a common driving process. Correspondingly, the prompt opening of the lock-up clutch necessary for this is provided for in the regular driving strategy of the torque converter. Such a driving strategy is usually based on characteristic curves that trigger a command to actuate the lock-up clutch, i.e. to open or close it depending on the situation.

Patent document EP 1 906 063 B1, for example, describes a method for controlling the actuation of a torque converter lock-up clutch for a torque converter. In this case the actuation of the torque converter lock-up clutch is controlled in such manner as to maintain an engine rotation speed within a predetermined rotation speed range when a transmission input rotation speed is lower than a threshold value. If the transmission input rotation speed is higher than the threshold value, the actuation of the torque converter lock-up clutch is controlled in such manner as to maintain a slippage across the torque converter at a predetermined slip level.

This known method is recognizably provided for the regular operation of a vehicle drive-train, i.e. for fault-free operation. Thus, it is implemented by the usual driving strategy. Faulty functions, for example in the driving strategy, can perturb such operation.

SUMMARY

The purpose of the present invention is to improve upon the prior art. In particular, safety should be improved when actuating the converter lock-up clutch of a hydrodynamic torque converter.

This objective is achieved by the measures specified in the principal claims. Preferred embodiments thereof emerge from the subordinate claims.

A method is proposed for actuating a converter lock-up clutch of a hydrodynamic torque converter in a vehicle drive-train by means of a safety function, in particular for holding the vehicle at rest or for maneuvering it slowly. Usually the lock-up clutch is in the form of a disk clutch. The safety function is provided in addition to a driving strategy function. The safety function and the driving strategy function are both capable of actuating the lock-up clutch. This takes place in that the respective function (safety function, driving strategy function) issues a command for actuating the clutch, for example a command to open the clutch.

The driving strategy function serves to operate the lock-up clutch in a regular (fault-free) manner. On the other hand, the safety function serves for the irregular operation of the lock-up clutch. Preferably therefore, the safety function only occurs when the driving strategy function opens the lock-up clutch other than as it should.

It is provided that a rotation speed existing at the torque converter is monitored. This monitoring is carried out in particular by the safety function. If the monitored rotation speed falls below a rotation speed threshold, then the safety function actuates the converter lock-up clutch in the opening direction. Thus, this actuation takes place independently of the actuation of the converter lock-up clutch by the driving strategy function. A command by the driving strategy function to actuate the converter lock-up clutch is rendered obsolete by the command by the safety function.

Preferably, a value of the monitored rotation speed is determined directly, for example in the unit [1/min] or [1/s]. As proposed, however, a rotation speed-dependent magnitude can be determined which expresses the monitored rotation speed indirectly and is accordingly indicative of the monitored rotation speed at the torque converter. The term "rotation speed" thus includes a direct value of the rotation speed and also a value that is indicative of the rotation speed monitored. The same applies to the rotation speed threshold. This can be stored directly as a rotation speed value or as a magnitude which is indicative of the rotation speed threshold.

In particular, the rotation speed threshold is chosen so (low) that the safety function is not yet involved in the actuation of the clutch by the driving strategy function during regular operation. Thus, during regular operation the driving strategy function provides for a command to actuate the clutch in the opening direction, as in particular for holding the vehicle at rest or maneuvering it slowly. This opening by the driving strategy function is provided for at other (higher) rotation speeds such as envisaged by the safety function. In particular, the opening of the clutch by the driving strategy function takes place with reference to one or more characteristic curves and/or diagrams. If the driving strategy function has its own rotation speed threshold for opening the clutch, this is in particular higher than said rotation speed threshold of the safety function.

For many reasons the opening of the clutch by the driving strategy function can be omitted or carried out erroneously. For example there may be a fault in the sensor system of the transmission for a transmission output rotation speed (this corresponds to a speed signal of the vehicle), or threshold values of the driving strategy may have been erroneously stored in the control unit or changed in an unacceptable way. To guard against this, the safety function is provided in addition. By virtue of the safety function, in that respect a diverse redundancy is provided for the opening of the lock-up clutch at low speeds/low rotation speeds, in particular such as those that occur when the vehicle is at rest or maneuvering slowly.

Preferably, the driving strategy function and the safety function run on a vehicle control unit responsible for the lock-up clutch. In this case the driving strategy function can run on one function plane of the vehicle control unit and the safety function can then run on a safety plane of the vehicle control unit. This can improve the availability of the safety function. The safety plane includes in particular further safety and monitoring functions for achieving safe operation during irregular operation. In contrast, the function plane includes functions for regular operation.

Preferably, the safety function only takes account of falling below the rotation speed threshold for opening the clutch. Thus, no further magnitudes are taken into account by the safety function when opening the clutch. This simplifies the safety function and increases its reliability.

Preferably, the rotation speed threshold of the safety function is a predetermined rotation speed threshold. Accordingly, the value of the rotation speed threshold is stored permanently in a control unit for actuating the lock-up clutch. No dynamic change of the value of the rotation speed threshold during the operation of the converter is then provided for. This, too, simplifies the safety function and increases its reliability. Regardless, the rotation speed threshold can be adapted. Thus, an input or over-writing of the rotation speed threshold can take place in the context of production, repair, or maintenance of the drive-train.

Preferably, the rotation speed threshold of the safety function is in the region of an idling rotation speed of the drive engine of the vehicle drive-train. In this case the drive engine is coupled with the torque converter on its input side. In particular, the drive engine is then an internal combustion engine. The input of the torque converter can in that case be coupled rotationally fixed to the crankshaft of the drive engine. In that way the lock-up clutch is opened in time to prevent stalling of the drive engine. Idling speed control normally takes place only if the rotation speed falls below the idling rotation speed. Thus, the clutch is reliably opened before the idling speed control comes into play.

Preferably, the safety function issues a clutch actuation command if the rotation speed falls below the rotation speed threshold, in order to open the lock-up clutch fully or at least to the point where the idling speed control of the drive engine can maintain the operation of the drive engine further with the clutch correspondingly open—i.e. even with the vehicle at rest. In this case the lock-up clutch can be operated with slip. This prevents stalling of the drive engine. The permissible slip of the clutch depends on the setting of the idling speed control of the drive engine. In particular, if the rotation speed falls below the rotation speed threshold, then the safety function issues a clutch actuation command to open the lock-up clutch completely. This very largely excludes stalling of the drive engine.

To monitor the rotation speed at the torque converter, this is preferably measured. For that purpose, for example, an extra rotation speed sensor can be provided. Preferably, however, recourse for this can be had to one or more rotation speed sensors already present in the drive-train. Alternatively, the rotation speed can be determined with reference to one or more other magnitudes which are indicative of the rotation speed monitored—as already explained earlier. For example, with reference to a transmission gear step present in the transmission and a determined vehicle speed, the rotation speed at the output of the torque converter can be deduced. In this case, instead of the vehicle speed the transmission output speed can be used. In particular, the rotation speed at the output of the torque converter is the transmission input rotation speed.

Preferably, the input rotation speed of the torque converter and/or the output rotation speed of the torque converter is the said monitored rotation speed. Accordingly, if that input speed and/or that output speed falls below the rotation speed threshold, the safety function commands the opening of the converter lock-up clutch. In this context the input rotation speed is the rotation speed at the drive input of the torque converter and the output rotation speed is the rotation speed at the drive output of the torque converter. In particular, the torque converter is drive-connected between the drive engine and a multi-gear vehicle transmission. Then, the input rotation speed of the converter at the same time corresponds to the rotation speed of the drive engine. It is not strictly necessary for the rotation speed to be measured directly at the input and/or output of the converter. Thus, rotation speed sensors can be used which are present elsewhere than at the converter, such as an engine rotation speed sensor of the drive engine and/or a rotation speed sensor at the transmission input. As explained earlier, this implies that magnitudes are monitored which are indicative of the input rotation speed or the output rotation speed and these are then used for the safety function.

Preferably, both the input rotation speed and the output rotation speed of the torque converter are monitored. If the input rotation speed or the output rotation speed then fall(s) below the rotation speed threshold, the safety function actuates the converter lock-up clutch in its opening direction. It is sufficient for only one of the input rotation speed and output rotation speed to get below the rotation speed threshold for the safety function to command the opening of the clutch. In this connection, in particular a common rotation speed threshold is provided for the input and output rotation speeds. This measure ensures a particularly reliable opening of the clutch by the safety function, even if one of the rotation speed sensors fails.

Preferably, the rotation speed monitored is a rotation speed ratified by a plausibility check. This means that the rotation speed monitored is continuously checked for plausibility by a plausibility function. If during this it turns out that the rotation speed monitored is not plausible, safety measures can be carried out. For example, a plausibility check of the output rotation speed can take place by comparing it with the quotient between the transmission output rotation speed and the gear ratio engaged. A plausibility check of the input rotation speed of the converter can for example take place by comparing it with an engine rotation speed determined independently by the drive engine. If this shows up large differences, the monitored rotation speed of the converter is not plausible. That rotation speed should then no longer be automatically taken into account by the safety function for opening the clutch. As a safety measure, if the monitored rotation speed is found to be implausible the converter lock-up clutch can for example be opened immediately by the safety function or the rotation speed recognized as implausible can be ignored by the safety function. In that way an emergency opening of the converter lock-up clutch secured in accordance with ASIL (Automotive Safety Integrity Level) is carried out.

Preferably, the lock-up clutch is actuated by a hydraulic pressure. The safety function then commands the opening of the lock-up clutch by triggering the application of a corresponding hydraulic actuation pressure for actuating the converter lock-up clutch. This has been found to be a particularly suitable actuation method for the clutch. In particular, the pressure in a hydraulic actor of the clutch is reduced in order to open it. The actual opening process can be brought about by a spring force and/or by a pressure force acting upon the said actor from the outside.

Preferably, the driving strategy function and the safety function are, in each case, designed so as to call for an actuation of the converter lock-up clutch by issuing a respective clutch actuation command to a hydraulic control unit for the converter lock-up clutch. The hydraulic control unit is in particular arranged in or on the multi-gear vehicle transmission with which the converter is associated. The hydraulic control unit then also serves for the hydraulic actuation of shifting elements of the transmission, in particular for the engagement of gear ratios of the transmission. The hydraulic control unit actuates the converter lock-up clutch by applying an actuation pressure to the hydraulic actor of the converter lock-up clutch; in particular, the hydraulic control unit fills a piston space of a hydraulic piston of the clutch with an appropriate hydraulic pressure.

The activated safety function preferably checks (only) whether the monitored rotation speed is lower than the predetermined rotation speed threshold when the driving strategy function issues to the hydraulic control unit a clutch actuation command to close the converter lock-up clutch. Thus, the safety function is only active when it detects that the driving strategy function has called for the clutch to be closed. When the driving strategy function commands the opening itself, there is no need for the safety function to become active. Accordingly, the check by the safety function does not then take place. If the safety function carries out the check and thereby determines that the monitored rotation speed is lower than the rotation speed threshold, it issues the clutch actuation command to open the converter lock-up clutch.

In other words, in this procedure the safety function recognizes that the driving strategy function has commanded the closing of the clutch. Thereupon, the safety function checks whether the monitored rotation speed is below the rotation speed threshold. If it is, then the safety function immediately commands the opening of the clutch. No reaction by the safety function takes place either if the driving strategy function has not commanded the closing of the clutch, or if the monitored rotation speed is not (yet) below the rotation speed threshold. Thus, during irregular operation the hydraulic control unit first receives the command from the driving strategy function to close the clutch and very soon after that the command from the safety function to open the clutch. When the safety function is activated this process takes place each time the driving strategy function commands the closing of the clutch. In particular, the checking and issuing of the corresponding command by the safety function take place so quickly that the hydraulic control unit and/or the actuation system of the clutch has not yet had time to react to the clutch closure command issued by the driving strategy function. Thus, the correction of that command by the safety function is not perceptible to occupants of the vehicle.

It can be provided that the safety function is permanently activated. In particular, it is permanently activated when the driving strategy function is activated. This is the case when the drive-train of the vehicle is in operation, for example as soon as the ignition of the vehicle is turned on. That simplifies the safety function and thereby increases its operational reliability. Alternatively, it can be provided that the safety function is deactivated above a threshold of the vehicle speed or a threshold of the rotation speed, and is activated below those thresholds. The rotation speed is, in particular the input rotation speed and/or output rotation speed of the converter. When the vehicle speed or the rotation speed is high enough, no stalling of the drive engine is to be expected. Then, carrying out the safety function can be dispensed with. In particular, this saves computation capacity in the vehicle control unit, which implements the safety function. When the safety function is deactivated, in particular the rotation speed is not monitored, and/or the monitored rotation speed is not compared with the rotation speed threshold, and/or no actuation command to open the clutch is issued. Instead of the vehicle speed or the rotation speed, a magnitude can also be used which indicates the said vehicle speed or rotation speed. In particular, this vehicle speed or rotation speed threshold is predetermined and stored permanently in the control unit—analogously with the rotation speed threshold.

The proposed vehicle control unit serves to actuate the converter lock-up clutch of the hydrodynamic torque converter in the vehicle drive-train. The vehicle control unit is specially designed to carry out the proposed method. Correspondingly, the vehicle control unit incorporates the said safety function and the said driving strategy function. For this, in particular, corresponding program codes are stored in the memory of the control unit, which are implemented by at least one processor of the control unit when the control unit is operating. The vehicle control unit is linked to the surroundings by inlets and outlet ports. The control unit also receives the necessary information, in particular such as the monitored rotation speed, and the control unit also issues the rotation speed commands, in particular such as the command to actuate the lock-up clutch. As already explained earlier, the control unit also serves to operate the multi-gear vehicle transmission, in particular to actuate shifting elements of the transmission in order to engage gear ratios of the transmission.

The computer-readable storage medium also proposed has a program code stored on it. The program code causes the proposed method to be carried out when the program code is implemented in a vehicle control unit for the actuation of a converter lock-up clutch of a hydrodynamic torque converter.

BRIEF DESCRIPTION OF THE DRAWINGS

Below, the invention is explained in greater detail with reference to figures showing further preferred embodiments of the invention. These show, in each case represented schematically.

DETAILED DESCRIPTION

Figure 1:
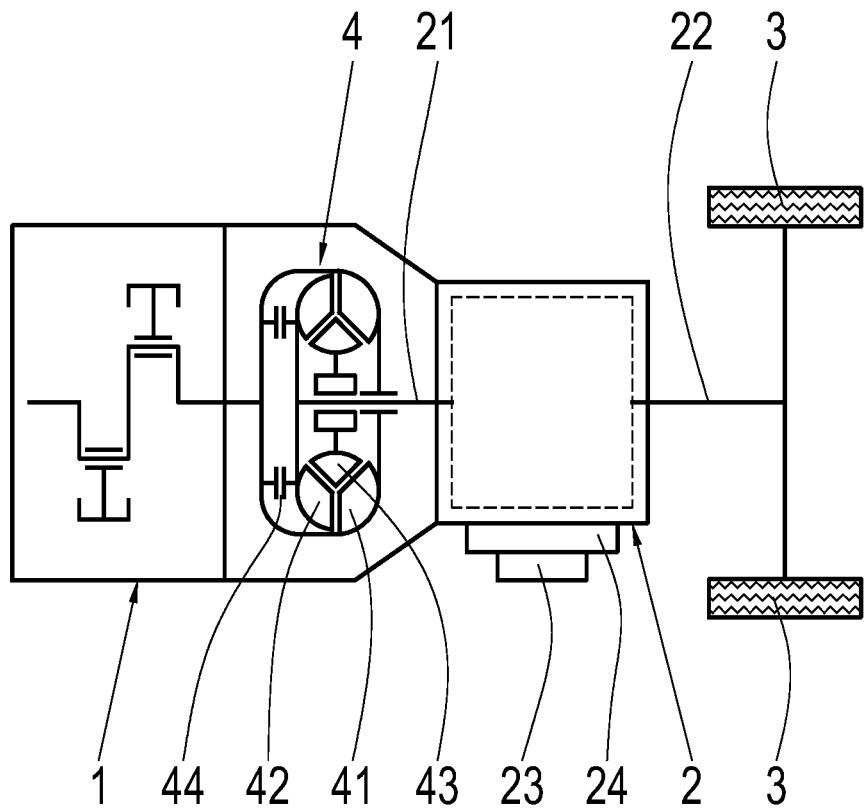
FIG. 1: A vehicle drive-train.

FIG. 1 shows a vehicle drive-train viewed from above, for example for a passenger car or a truck.

The drive-train comprises a drive engine 1, for example in the form of an internal combustion engine, and a multi-gear transmission 2. The transmission 2 is for example in the form of an automatic transmission. With the transmission 2 a selection of gears can be engaged in order to convert the rotation speed and torque of the drive engine 1 in accordance with the driving situation. On the drive output side of the transmission 2 the drive power is transmitted to drive wheels 3. In drive-connection between the drive engine 1 and the transmission 2 a hydrodynamic torque converter 4 is provided. Alternatively, the converter 4 can be provided inside the transmission 2 so that it forms an integral part of the transmission 2.

The structure of such a converter 4 is already known as such, so here the said structure will only be outlined in brief. The converter comprises a pump wheel 41 and a turbine wheel 42 that can be driven hydrodynamically by the pump wheel 41. Optionally, an additional guide wheel 43 can be provided. The pump wheel 41 forms the drive-technological drive/input of the converter 4. The turbine wheel forms the drive-technological drive/output of the converter 4. The force transmission taking place by virtue of the pump wheel 41 and the turbine wheel 42 can be bridged across mechanically by closing a converter lock-up clutch 44 arranged inside the converter 4. Thus, optionally the clutch 44 forms or releases a rotationally fixed mechanical coupling between the input and output of the converter 4. In particular, the clutch 44 is in the form of a disk clutch. To actuate the clutch 44, an actor (not shown) is provided inside the converter 4. In this case, the said actor is in particular hydraulically actuated, for example a hydraulic cylinder.

The input of the converter 4 is coupled rotationally fixed to the drive engine 1. Thus, the input rotation speed of the converter 4 corresponds to the motor rotation speed of the drive engine 1. The output of the converter is coupled rotationally fixed to the transmission input shaft 21. Thus, the output rotation speed of the converter 4 corresponds to the input rotation speed of the transmission 2.

The converter 4 serves at least as a starting clutch. When the vehicle is staring off and driving slowly, it transmits the drive power from the drive engine 1 to the transmission 2, largely by hydrodynamic means. When starting, the transmission input shaft 21 and thus the output of the converter 4 are at first stationary. At the same time, the drive engine 1 is turning the input of the converter 4. Then, there is a relative rotation between the pump wheel 41 and the turbine wheel 42, which produces the hydrodynamic force transmission in the converter 4. In such a case the clutch 44 must be open far enough for the rotation speed of the drive engine 1 not to be reduced too much. The same applies during slow maneuvering of the vehicle.

At higher speeds (this corresponds to higher rotation speed of the transmission input shaft 21 and the transmission output shaft 22) the clutch 44 is normally closed in order to bridge mechanically across the hydrodynamic force transmission in the converter 4, which is substantially affected by losses.

The actuation of the clutch 44 is controlled by a control unit 23. For that purpose, the control unit 23 issues respective actuation commands for the clutch 44 to a hydraulic control unit 24. The hydraulic control unit 24 transforms the command from the control unit 23 into an associated actuation pressure for the actor of the clutch 44, for example by means of one or more electrically actuated valves. The actuation pressure can for example be passed into the converter 4 and on to the actor of the clutch 44 via a shaft bore.

Preferably, the control unit 23 and the hydraulic control unit serve not only to actuate the clutch 44, but also to actuate shifting elements of the transmission 2 with which gears of the transmission 2 can optionally be engaged and disengaged.

The regular actuation of the clutch 44, i.e. when nothing is wrong, takes place by virtue of a driving strategy function stored in the control unit 23. The driving strategy function can also be provided in order to bring about the actuation of the shifting elements of the transmission 2. In that way a mode of operation of the drive-train is made possible which is coordinated between the converter 4 and the transmission 2. Preferably, for that purpose the control unit 23 processes rotation speeds and/or the speed of the vehicle. A measure for the vehicle speed is in particular the rotation speed of the transmission output shaft 22. The command to actuate the clutch 44 and the transmission shifting elements is issued in particular with reference to characteristic curves and/or diagrams stored in the control unit 23. Correspondingly, during regular operation the opening of the clutch 44 in order to hold the vehicle still and for slow maneuvering of the vehicle is brought about by the driving strategy function.

During operation, problems can arise, for example, due to the failure of a sensor or if the driving strategy function is carried out incorrectly. It can then happen that the opening of the clutch 44 is erroneously not called for. When the vehicle is at rest or maneuvering, the rotation speed of the drive engine 1 is then reduced due to the closed clutch 44 until the idling speed control is brought into play. The idling speed control seeks to maintain the motor rotation speed required for the engine 1 to keep operating. If the idling speed control is set too high the vehicle will accelerate unintentionally, while if it is set too low the motor rotation speed will decrease further until the engine 1 stalls.

An extra safety function is now provided in the control unit 23, which reliably brings about the opening of the clutch 44 for holding the vehicle at rest or maneuvering it even when this is not done by the driving strategy function. In particular, the safety function only intervenes when irregular operation is taking place.

Figure 2:
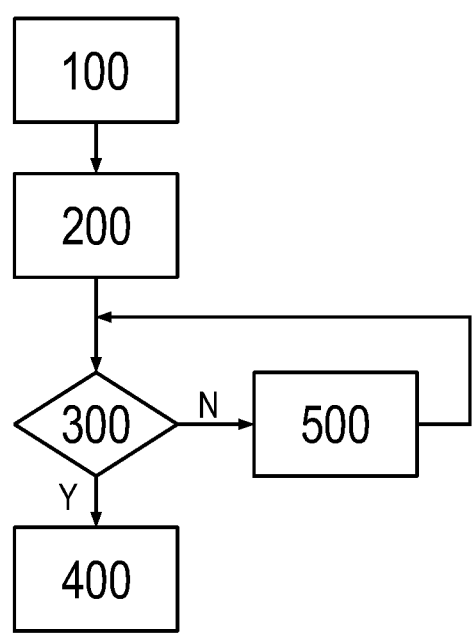
FIG. 2: A flow-chart of a method.

The procedure of the safety function is illustrated in FIG. 2. In this procedure it is assumed that the speed of the vehicle is relatively low. For example, the vehicle is actually stopped or is maneuvering. Accordingly, the rotation speeds at the transmission output shaft 22 and the transmission input shaft 21 are relatively low. The rotation speed of the transmission input shaft 21 has fallen to just below the idling speed of the drive engine 1.

Step 100: As a result of irregular operation the driving strategy function calls for closing of the clutch 44. It issues a corresponding clutch actuation command, in particular to the hydraulic control unit 24.

Step 200: The safety function recognizes that the driving strategy function has issued the command to close the clutch 44.

Step 300: The safety function monitors the rotation speed at the input of the converter 4 (this corresponds to the motor rotation speed) and the rotation speed at the output of the converter 4 (this corresponds to the rotation speed at the transmission input shaft 21). This monitoring takes place continuously, i.e. at least always when the safety function is activated. Or else, the monitoring only takes place when the safety function has recognized that the driving strategy function has issued a command to close the clutch 44. The safety function checks whether either the rotation speed at the input of the converter 4 or the rotation speed at the output of the converter 4 is below a rotation speed threshold stored in the control unit 23. In particular, this rotation speed threshold is in the region of the idling speed of the engine 1.

Step 400: Decision path Y: If the safety function recognizes that one of the two monitored rotation speeds (or even both of them) is/are below the rotation speed threshold, the safety function for its part commands the opening of the clutch 44. Thus, independently of the driving strategy function, it issues a corresponding clutch actuation command of its own, in particular to the hydraulic control unit 24.

In practice there is a slight time delay between the command by the driving strategy function to close the clutch 44 (Step 100) and the command by the safety function to open the clutch 44 (Step 400). Thus, the command to open the clutch 44 reverses the immediately preceding command to close it, still in time before the clutch actor can close the clutch 44.

Step 500: Decision path N: If the safety function recognizes that neither of the two monitored rotation speeds is below the rotation speed threshold, no separate command to actuate the clutch 44 is issued by the safety function. In such a case the rotation speeds are still high enough for the clutch 44 to be closed without risk on the basis of the command from the driving strategy function (Step 100). Preferably, however, the safety function still remains active. Thus, it still monitors the said rotation speeds and carries out the check as in Step 300 continuously, so as to be able to react promptly by opening the clutch 44 if the rotation speeds should fall to an unacceptable extent.

To prevent the procedure shown in FIG. 2 from being carried out unnecessarily at relatively high rotation speeds or vehicle speeds, the safety function can then be deactivated. In particular it is only activated when the rotation speeds at the input or output of the converter 4 are low enough. In FIG. 2, for example, before Step 100 the safety function can have been activated because one of the rotation speeds or the speed of the vehicle has fallen below a threshold for activating the safety function.

INDEXES

1 Drive engine
2 Transmission
21 Transmission input shaft
22 Transmission output shaft
23 Control unit, transmission control unit
24 Hydraulic control unit
3 Drive wheel
4 Hydrodynamic torque converter
41 Pump wheel
42 Turbine wheel
43 Guide wheel
44 Converter lock-up clutch

100 Process step
200 Process step
300 Process step
400 Process step
500 Process step

The invention claimed is:

1. A method for actuating a converter lock-up clutch of a hydrodynamic torque converter in a vehicle drive-train by means of a safety function, the method comprising:
    providing the vehicle drive-train with the hydrodynamic torque converter having the safety function configured to actuate the converter lock-up clutch and to actuate a driving strategy function by issuing a clutch actuation command;
    monitoring, by the safety function, at least one rotation speed at the hydrodynamic torque converter to determine a monitored rotation speed;
    determining that the monitored rotation speed falls below a rotation speed threshold; and
    issuing, by the safety function, the clutch actuation command, to open the converter lock-up clutch.

2. The method according to claim 1, wherein monitoring the at least one rotation speed comprises monitoring an input rotation speed and/or monitoring an output rotation speed at the hydrodynamic torque converter.

3. The method according to claim 2, wherein monitoring the at least one rotation speed comprises monitoring a rotation speed ratified by a plausibility check.

4. The method according to claim 3, wherein the plausibility check comprises:
    comparing an input rotation speed at the hydrodynamic torque converter with an engine rotation speed; and
    determining a plausibility of the input rotation speed based on comparing the input rotation speed at the hydrodynamic torque converter with the engine rotation speed.

5. The method according to claim 4, comprising:
    determining that the input rotation speed is implausible; and
    opening the converter lock-up clutch.

6. The method according to claim 3, wherein the plausibility check comprises comparing an output rotation speed with a quotient between a transmission output rotation speed and a gear ratio of an engaged gear.

7. The method according to claim 6, comprising:
    determining that the transmission output rotation speed is implausible; and
    opening the converter lock-up clutch.

8. The method according to claim 1, wherein the rotation speed threshold is in a range of an idling rotation speed of a drive engine coupled on an input side to the hydrodynamic torque converter.

9. The method according to claim 1, wherein the converter lock-up clutch is actuated by a hydraulic pressure, and wherein the safety function commands the actuation of the converter lock-up clutch by generating a corresponding hydraulic actuation pressure in order to actuate the converter lock-up clutch.

10. The method according to claim 9, wherein each of the driving strategy function and the safety function is configured to call for an actuation of the converter lock-up clutch by issuing the clutch actuation command to a hydraulic control unit for the converter lock-up clutch, and the method comprises:
    the hydraulic control unit actuating the converter lock-up clutch by applying an actuation pressure to a hydraulic actor of the converter lock-up clutch;

the safety function checking whether the monitored rotation speed is below a predetermined rotation speed threshold when the driving strategy function issues to the hydraulic control unit the clutch actuation command to close the converter lock-up clutch; the safety function recognizing that the monitored rotation speed is below the rotation speed threshold; and the safety function issuing the clutch actuation command to the hydraulic control unit to open the converter lock-up clutch.

11. The method according to claim 1, wherein the safety function is activated continuously.

12. The method according to claim 1, wherein the rotation speed threshold is a first threshold, and the method comprising deactivating the safety function above a predetermined threshold for a speed of the vehicle or above a second threshold for the at least one rotation speed at the hydrodynamic torque converter.

13. A vehicle control unit for actuating the converter lock-up clutch of the hydrodynamic torque converter in the vehicle drive-train, wherein the vehicle control unit is configured to carry out the method according to claim 1.

14. The vehicle control unit according to claim 13, wherein the driving strategy function runs on a function plane of the vehicle control unit and the safety function runs on a safety plane of the vehicle control unit, wherein the function plane includes functions for regular operation of the converter lock-up clutch and the safety plane includes safety and monitoring functions.

15. A computer-readable storage medium with a stored program code that, when executed by a vehicle control unit for actuating the converter lock-up clutch of the hydrodynamic torque converter, carries out the method according to claim 1.

16. The method according to claim 1, wherein the hydrodynamic torque converter is drive-connected between a drive engine and a multi-gear vehicle transmission.

* * * * *